United States Patent
Nazarov et al.

(10) Patent No.: US 10,037,149 B2
(45) Date of Patent: Jul. 31, 2018

(54) READ CACHE MANAGEMENT

(71) Applicant: Seagate Technology LLC, Cupertino, CA (US)

(72) Inventors: Alexey V. Nazarov, Highlands Ranch, CO (US); Andrew Michael Kowles, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 174 days.

(21) Appl. No.: 15/185,497

(22) Filed: Jun. 17, 2016

(65) Prior Publication Data

US 2017/0364447 A1 Dec. 21, 2017

(51) Int. Cl.
*G06F 3/06* (2006.01)
*G06F 12/08* (2016.01)
*G06F 12/0871* (2016.01)

(52) U.S. Cl.
CPC ............ *G06F 3/0611* (2013.01); *G06F 3/068* (2013.01); *G06F 3/0641* (2013.01); *G06F 3/0656* (2013.01); *G06F 12/0871* (2013.01)

(58) Field of Classification Search
None
See application file for complete search history.

(56) References Cited

U.S. PATENT DOCUMENTS

| | | | |
|---|---|---|---|
| 8,504,774 B2 | 8/2013 | Khawand et al. | |
| 2003/0061546 A1* | 3/2003 | Collins | G06F 11/3476 714/42 |
| 2015/0026416 A1* | 1/2015 | Nemazie | G11C 16/0483 711/141 |
| 2015/0062736 A1* | 3/2015 | Kim | G11B 20/1252 360/48 |

* cited by examiner

*Primary Examiner* — Gary W Cygiel
(74) *Attorney, Agent, or Firm* — Holzer Patel Drennan

(57) ABSTRACT

Implementations disclosed herein provide for a storage system including an on-disk read cache and a variety of read cache management techniques. According to one implementation, a storage device controller time-sequentially reads a series of non-contiguous data blocks storing a data sequence in a read cache of a magnetic disk, the data sequence identified by a requested sequence of logical block addresses (LBAs). The controller determines that read requests for the data sequence satisfy at least one predetermined access frequency criterion and, responsive to the determination, the controller re-writes data of the data sequence to a series of contiguous data blocks in the read cache.

17 Claims, 5 Drawing Sheets

READ CACHE MANAGEMENT

BACKGROUND

In data storage systems, particular read access patterns, identifiable as logical block address (LBA) sequences, occur repeatedly. Executing read commands in an order of receipt may entail retrieving data stored in over a large spatial area on a storage medium. In some storage devices with moving parts, such as hard drive assemblies, such access patterns have strong adverse effects on device performance. In these devices, an actuator arm of the storage device may have to move between different radial positions to read physically disparate data. Excessive actuator arm movement is time consuming and a non-trivial power consumer.

SUMMARY

In one implementation, the disclosed technology provides a method of data management utilizing a read cache on a magnetic disk. The method entails time-sequentially reading a series of non-contiguous data blocks storing a data sequence in a read cache of a magnetic disk and determining that read requests for the data sequence satisfy at least one predetermined access frequency criterion. Responsive to the determination, re-writing data of the data sequence to a series of contiguous data blocks in the read cache to facilitate a subsequent sequential read of the data sequence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

BRIEF DESCRIPTIONS OF THE DRAWINGS

The described technology is best understood from the following Detailed Description describing various implementations read in connection with the accompanying drawings.

DETAILED DESCRIPTIONS

As the requirements for data storage, retrieval, and analysis have increased, the demand for cheaper and faster data storage devices has also increased. Hard disk drives (HDDs) are widely used as data storage device computing systems. Such data storage devices include disk drives that store data on magnetic media, optical media, etc. Solid state devices (SSDs), in contrast, have no moving components and use integrated circuit assemblies as memory to store data. SSDs offer advantages in data access speed and system performance, while HDDs offer advantages in cost. Hybrid drives, also referred to as SSHDs, combine HDD technology and SSD technology to leverage advantages of cost and speed.

Some SSHDs use a flash component as a read cache to allow for quick access to frequently or recently accessed data (also referred to herein as "hot" data). When SSD memory, such as flash, is used as a read cache, all data in the read cache can be accessed with equal speed. In this case, the order in which cache data cells are actually arranged in the flash has no impact on system performance. In contrast, delays in access speed of HDDs are largely attributable to physical locations of data and the associated time required for an actuator arm to "seek" to each physical location to perform a read or write operation. Consequently, it is rare for HDD systems to include any type of read cache physically located on a magnetic disk.

The herein disclosed technology disclosed provides data management techniques that allow an HDD to mimic desirable drive performance features of an SSHD. In one implementation, this is achieved using an on-disk read cache. A variety of herein disclosed read cache management techniques provide increased device performance, such as techniques relating to dynamic heat sequence detection, techniques for cache data re-sequencing, techniques for cache data duplication management, and techniques for dynamic cache storage allocation.

Figure 1:
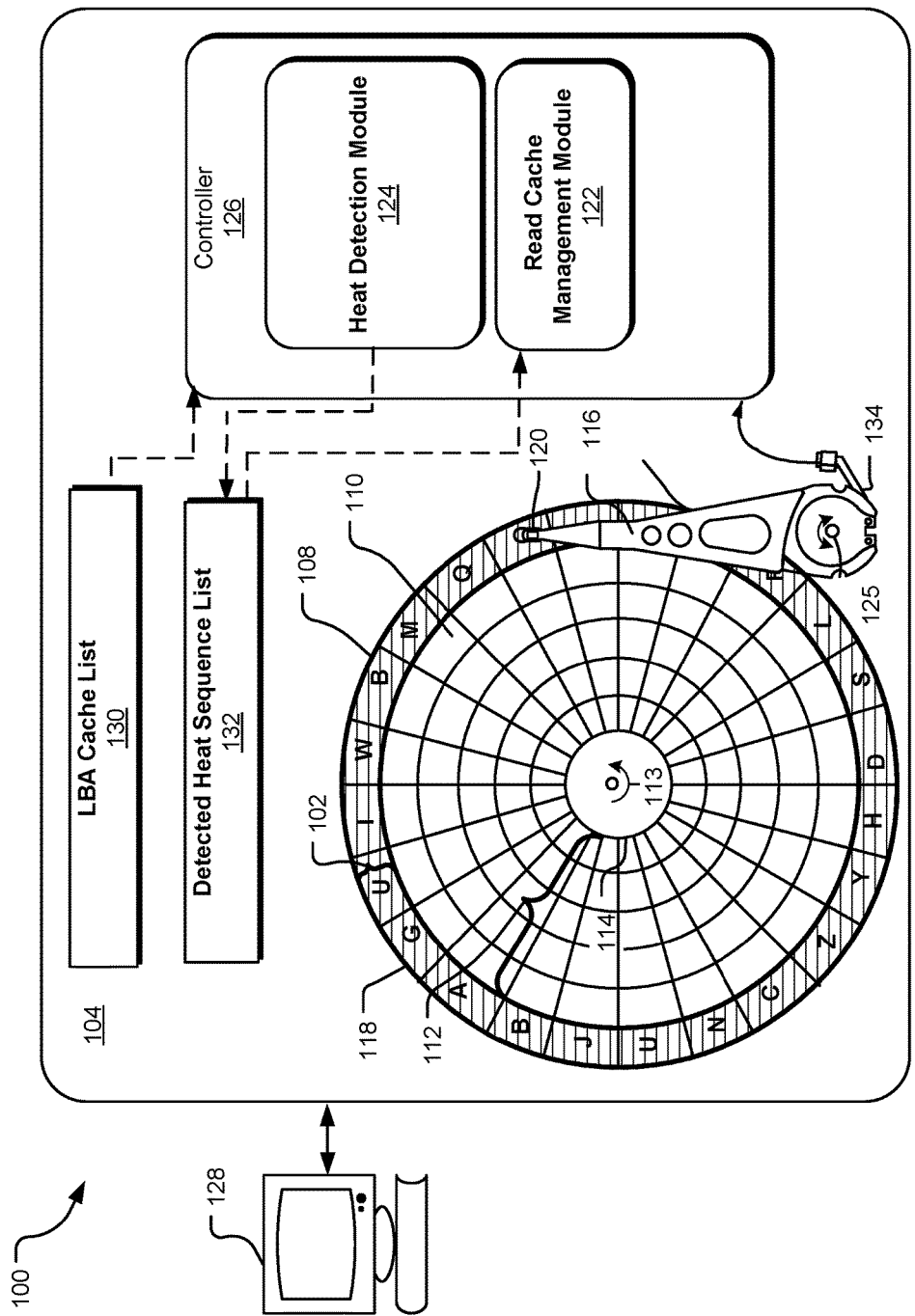
FIG. 1 illustrates an example data storage system with a storage device including an on-disk read cache and a controller that implements techniques for dynamic re-sequencing of the read cache.

FIG. 1 illustrates an example data storage system 100 with a storage device 104 including an on-disk read cache (hereinafter "read cache 102") and a controller 126 that implements techniques for dynamic resequencing of the read cache 102. The storage device 104 includes a disk 108 that has a number of data blocks (e.g., a sector 110), which can hold a set number of storage bytes.

The storage device 104 includes a head 120 on a distal end of an actuator arm 116 positioned over the disk 108. A rotary voice coil motor that rotates about an actuator axis of rotation 125 is used to position the head 120 on a concentric data track including a target sector, while a spindle motor that rotates about disk axis of rotation 113 is used to rotate the disk 108. A flex cable 134 provides the requisite electrical connection paths for the head 120 while allowing pivotal movement of the actuator arm 116 during operation to move the head 120 between radial positions proximal to an inner diameter 114 and an outer diameter 118 of the disk 108.

Storage space on the disk 108 is divided between at least the read cache 102 and a main store 112. The main store 112 is the primary data storage area that is read from and written to by a host computer 128. Each data block in the main store 112 is associated with a logical address (e.g., a logical block address (LBA)), which may be specified in a read or write command transmitted to the storage device 104 by the host computer 128. In contrast to the main store 112, the read cache 102 is used for redundant storage of data meeting certain "hot data" requirements. For example, the read cache may store a redundant copy of data determined to be "frequently accessed" or that has been "recently accessed" according to predefined criteria. In various implementations, the storage device 104 may implement a variety of storage and data management techniques including, for example, conventional magnetic recording, shingled magnetic recording, interlaced magnetic recording, etc. Thus, the read cache 102 may, in different implementations, include tracks with different characteristics, such as shingled data tracks, unshingled data tracks, interlaced tracks, tracks arranged at an increased radial density (tracks-per-inch or TPI), etc.

In FIG. 1, the read cache 102 is shown located in a region near the outer diameter 118 of the disk 108. This location is beneficial to drive performance because data stored near the outer diameter 118 of the disk 108 rotates with greater linear speed and can, in general, be accessed more quickly than data stored near the inner diameter 114. The read cache 102 may include a single data track or multiple data tracks. In some implementations, the read cache 102 is located in an area different from that shown in FIG. 1, such as slightly inward of the outer diameter 118.

The storage device 104 may initially identify hot data using a variety of rules and techniques. In one implementation, the controller 126 identifies certain LBAs as "hot" based on a number of times each individual LBAs is read from or written to the main store 112. This determination is, in some implementations, performed independent of any order in which the LBAs are accessed. When new hot data is identified, a read cache management module 122 of the controller 126 writes the data to the read cache 102. The hot data may be initially arranged in the read cache 102 without regard for read order. For example, sequences of LBAs frequently read together may be stored on non-contiguous blocks, on different tracks, etc.

When the controller 126 receives a command to read data from the magnetic disk, the controller 126 checks an LBA cache list 130 to determine whether requested LBAs are available in the read cache 102 before seeking the actuator arm 116 to locations corresponding to the requested data within the main store 112. In the event that one or more of the requested LBAs is identified on the LBA cache list 130, the controller 126 may elect to retrieve the associated requested data from the read cache 102 rather than the main store 112.

In some instances, the host 128 may transmit the controller 126 a read request for a data sequence stored randomly in the read cache 102. As used herein, the term "data sequence" generally refers to data identifiable by a time-sequential sequence of logical addresses (LBAs) specified by the host 128 or the controller 126, such as in one or more read or write commands. A data sequence is said to be "stored randomly" on the magnetic disk 108 when the corresponding access sequence of requested LBAs does not correspond to a physically contiguous ordering of data blocks on the magnetic disk 108 that is readable according to a rotational access order of the storage device 104. In other words, a data sequence accessed "randomly" is not readable according to a natural time-sequential read access order of the storage device 104. For example, a read of a randomly-stored data sequence may entail one or many time-consuming seek and rotate operations that actuate the actuator arm 116 to a corresponding number of different radial positions.

In contrast to a randomly-stored data sequence, a data sequence is herein referred to as "sequential" or "stored sequentially" when the data sequence is identified by an access sequence of requested LBAs that does correspond to a series of physically contiguous data blocks on the magnetic disk 108 arranged according to the order of the access sequence of LBAs. The term "sequential read" is used herein to refer to a read of a physically sequential sequence of blocks performed according to the physical layout of rotational access order of the storage device 104. For example, contiguous data blocks arranged along a single data track may store a data sequence that may be read sequentially according to the natural, physical layout read order of the storage device 104. Likewise, contiguous data blocks spanning two adjacent tracks (e.g., all blocks on two adjacent data tracks) may store a data sequence that may be read sequentially according to the natural, physical layout read order of the storage device 104.

Due to an order in which hot data is identified in the main store 112 and copied into the read cache 102, the read cache 102 may include some data stored randomly, such as in small data chunks (e.g., 32 KB) that are not necessarily stored in physical relation to other small data chunks relating to the common files, programs, data routines, etc. Over time, however, a heat sequence detection module 124 monitors reads from the read cache 102 and begins to recognize and track "heat sequences" of the data retrieved from the read cache 102 (e.g., sequences that satisfy one or more access frequency criterion, such as criteria pertaining to frequency and/or recency of data access).

For example, the heat sequence detection module 124 may determine that a randomly-stored sequence of data blocks is frequently read from the read cache 102 in the following order "X, L, A, B, Q, W." In this example, X, L, A, B, Q, and W may each represent an individual LBA or a block of LBAs, such as a sector or multiple contiguously-stored data sectors. When requests to read this sequence (e.g., X, L, A, B, Q, W) satisfy predetermined access frequency criteria, the heat detection module 124 identifies the requested sequence as a "heat sequence." LBAs of each identified heat sequence are recorded in memory, such as in a detected heat sequence list 132 (e.g., an example log file), and the data of each heat sequence is physically rearranged within the read cache to permit a sequential read of each identified heat sequence. For example, the read cache management module 122 reads the randomly-stored data of each identified heat sequence, rearranges the data according to an order in which LBAs of the sequence were requested by the host 128, and re-writes the re-arranged data to the read cache 102 in a manner that permits a sequential read back of the data. For example, the read cache management module 122 re-writes the randomly-stored data blocks of an identified heat sequence as a series of contiguous data blocks arranged along a single data track within the read cache 102.

The LBA cache list 130 and/or detected heat sequence list 132 may each include a mapping of host LBAs to physical data blocks on the magnetic disk 108. For quick access, one or both of the LBA cache list 130 and/or the detected heat sequence list 132 may be stored in a volatile memory (not shown) of the storage device 104, such as DRAM. For example, mappings of the LBA cache list 130 and/or the detected heat sequence list 132 may be persistently stored on the magnetic disk 104 and loaded into the volatile memory whenever the storage device 104 acquires power after a power outage.

Dynamically re-arranging cache data to permit sequential reads of heat sequences, as described above, facilitates reads of heat sequence data according to an access speed similar to or on-par with that provided by more expensive SSHD devices that include a read cache in SSD memory. A variety of cache management techniques, some of which are described below, may be employed to complement this high access speed advantage, while providing optimized tradeoffs between performance and data storage capacity.

The controller 126 includes software and/or hardware, and may be implemented in any tangible computer-readable storage media within or communicatively coupled to the data storage device 100. As used herein, the term "tangible computer-readable storage media" includes, but is not limited to, RAM, ReRAM, MRAM, flash memory or other memory technology, and other solid state storage class memory or other optical disk storage, magnetic cassettes, magnetic tape, magnetic disk storage or other magnetic storage devices, or any other tangible medium which can be used to store the desired information and which can be accessed by a mobile device or computer. In contrast to tangible computer-readable storage media, intangible computer-readable communication signals may embody computer readable instructions, data structures, program modules or other data resident in a modulated data signal, such as a carrier wave or other signal transport mechanism.

Figure 2:
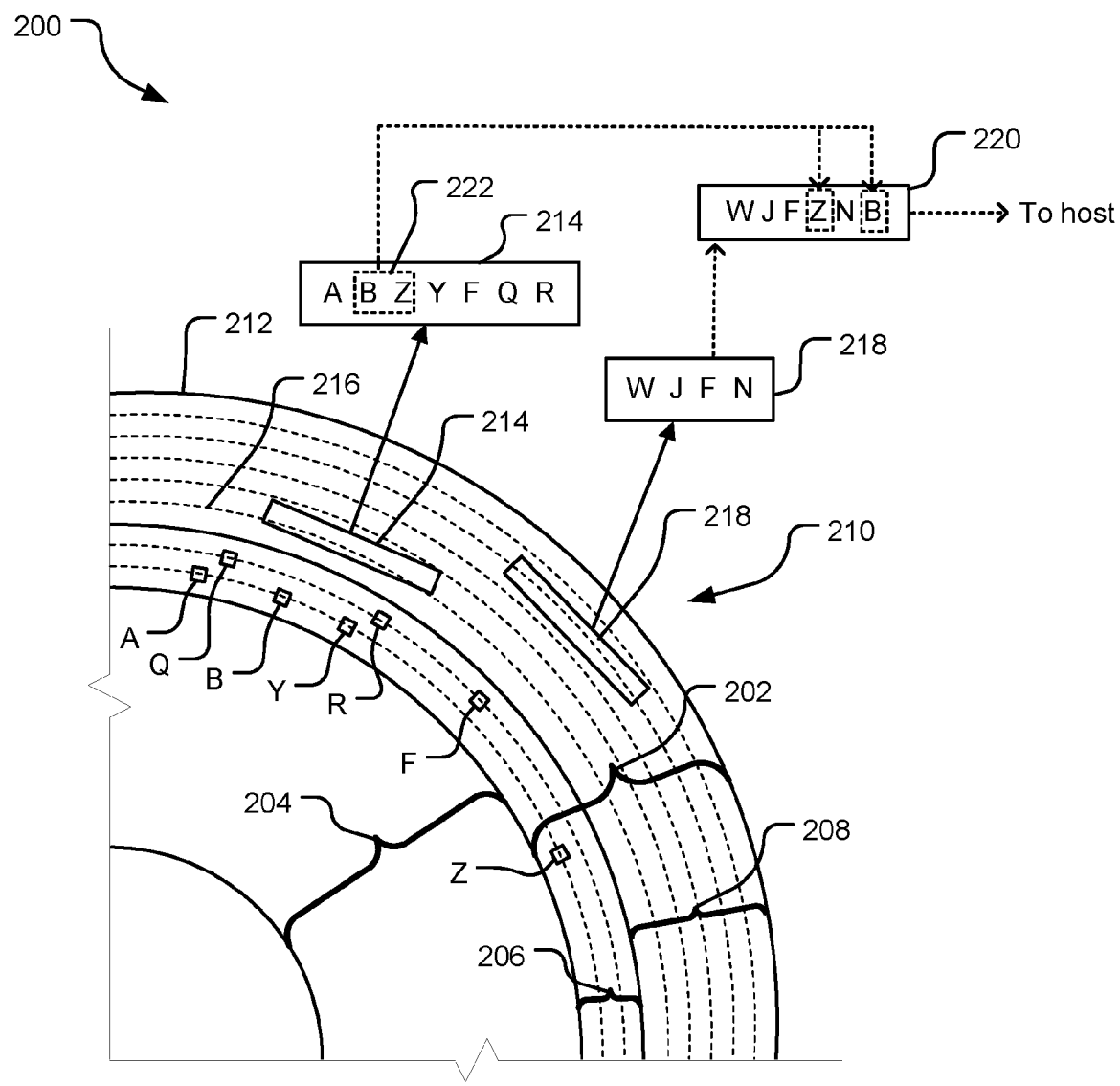
FIG. 2 illustrates an example storage system for implementing techniques for read cache re-sequencing and cache data duplication management.

FIG. 2 illustrates an example storage system 200 implementing techniques for read cache resequencing and duplication management. The storage system 200 includes at least one magnetic disk 210, with storage space allocated between a read cache 202 and a main store 204. Each data block in the main store 204 is associated with an LBA belonging to an addressing scheme of a host computer (not shown). The read cache 202, in contrast, stores redundant copies of data associated with LBAs determined to meet certain "hot data" criteria. The read cache 202 may include a single data track or multiple data tracks, and is divided into first and second contiguous regions, referred to herein as an incomplete region 206 and a complete region 208.

The incomplete region 206 stores hot data randomly, without regard for an order in which various blocks of data may be accessed. In contrast, the complete region 208 stores identified heat sequences sequentially, to permit for sequential read back of each sequence by a host device. In FIG. 2, the complete region 208 is shown closer to an outer diameter 212 of the magnetic disk 210 than the incomplete region 206; in other implementations, positioning of these regions may be reversed relative to the outer diameter 212 of the disk. In some implementations, the complete region 208 and incomplete region 206 are each contiguous, but do not share a boundary.

When individual LBAs or blocks of LBAs are initially identified as satisfying one or more predetermined access frequency criterion, data corresponding to the LBAs is initially written to the incomplete region 206. For example, a hot data detection module (not shown) may monitor data writes to the main store region 204 and identify frequently-accessed main store data blocks. In one implementation, a hot data detection module identifies frequently-performed small random reads (e.g., reads less than about 32 KB) of the main store 204. When these frequently-performed random reads satisfy one or more predetermined access frequency criterion, such as criteria related to frequency and/or recency of access, the corresponding data of the main store 204 is copied to the incomplete region 206 of the read cache 202. For example, the example data block "B" may be a 32 KB block of data that is accessed daily, weekly, monthly, or by some other frequency that satisfies the one or more predetermined access frequency criterion.

In one implementation, data of the main store 204 is identified as "hot data" and placed within the read cache 202 if accessed immediately (e.g., within one minute) of drive power-up. For example, a string of data blocks may be considered "hot" and copied from the main store 204 to the incomplete region 206 if the string is smaller than a certain size (e.g., 500 MB) and read within the first 60 seconds after the associated storage device is powered on.

Notably, some data blocks identified as hot data may be frequently accessed together, yet still be stored randomly within the incomplete region 206. For example, two blocks of LBAs may be occasionally or often requested time-sequentially (serially) by a host, but initially identified as "hot" at different times. In this case, the two blocks may be placed in the read cache 102 in a non-sequential read order.

Over time, a heat sequence detection module (not shown) discerns frequently requested read back sequences pertaining to the LBAs stored in the incomplete region 206 of the read cache 202. When access requests pertaining to these frequently-requested LBA sequences satisfy the predetermined access frequency criteria (e.g., pertaining to frequency and/or recency of access), the sequences are, in one implementation, logged as "heat sequences" and re-written sequentially in the complete region 208 of the read cache 202. For example, the heat sequence detection module may identify a heat sequence identifiable by a sequence of LBAs that consecutively correspond to non-consecutive physical blocks of the incomplete region 206. Upon identifying this heat sequence, the heat sequence detection module re-writes the heat sequence sequentially within the complete region 208 to permit a subsequent sequential read of the sequence. When an identified heat sequence is first written in the complete region 208, corresponding data blocks may be deleted or overwritten with other hot data in the incomplete region 206.

In the example of FIG. 2, the incomplete region 206 randomly-stores example hot data blocks labeled A, Q, B, Z, Y, R, and F. Each of these hot data blocks may represent an individual LBA or multiple LBAs, (e.g., a partial sector, full sector, or multiple sectors stored contiguously). When read from the incomplete region 206 of the read cache 202, these hot data blocks may be accessed much more quickly than the associated data blocks storing identical data in the main store 204. Notably, however, a read of block "A" followed by block "Q" entails a seek of an actuator arm from a first radial location to a second radial location. This seek translates to a delay in data access.

If the heat sequence detection module identifies the sequence "AQBQYFQR" as a heat sequence (e.g., because requests to read a corresponding LBA sequence satisfy some predetermined access frequency criteria), a read cache management module (not shown) reads data of the identified heat sequence from the incomplete region 206, re-arranges the data and writes the data sequentially according to a requested LBA sequence order within the complete region 208. For example, the heat sequence 214 includes the hot data blocks "ABZYFQR" arranged consecutively along a single data track 216, so as to facilitate a subsequent sequential read of the heat sequence 214. At the time that the heat sequence 214 is first written to the complete region 208, corresponding physical data blocks (e.g., A, B, Z, Y, F, Q, and R) in the incomplete region 206 may be made available for overwrite and storage of new hot data copied over from the main store 204. In another implementation, data blocks of an identified heat sequence are erased in the incomplete region 206 as soon as the heat sequence is written to the complete region 208.

In one implementation, the complete region 208 exclusively stores hot sequences and does not store any randomly-arranged data. Thus, all or substantially all data of the complete region 208 can be accessed via a sequential read of a corresponding heat sequence. Example hot sequences may include, for instance, executable code for initiating a frequently-used program, boot sequence, data of a frequently-played media file, data of a frequently-accessed word document, etc.

In some cases, moving data from the incomplete region 206 to the complete region 208 entails tracking and managing duplication, such as by recognizing and permitting duplication or by taking steps to mitigate or eliminate duplication. In one implementation, the storage device controller takes action to ensure that duplicate data blocks do not appear in both the incomplete region 206 and the complete region 208. In another implementation, the storage device controller takes action to ensure that duplicate data blocks do not appear—or appear in moderation up to a limited quantity—within the complete region 208.

In one implementation, heat sequence detection is performed by identifying and eliminating instances of duplication, such as by writing partial heat sequences to the complete region 208 instead of full heat sequences. For example, a newly-identified heat sequence 220 includes the data blocks 'WJFZNB.' When this heat sequence is first identified, some or all of the corresponding data blocks are stored randomly in the incomplete region 206. (Notably, some of the data blocks in the newly-identified heat sequence may already be stored in the complete region 208 within a previously-identified and sequentially-stored heat sequence).

When preparing to write the newly-identified heat sequence (e.g., W J F Z N B) to the complete region 208, the storage device controller determines whether any data blocks in the newly-identified heat sequence 220 already appear, in duplicate, within another one of the heat sequences in the complete region 208. In the illustrated example, the data blocks Z and B both already appear within the sequentially-stored heat sequence 214. Therefore, the storage device controller elects to write a partial heat sequence 218 to the complete region 208. The partial heat sequence 218 omits the blocks Z and B but sequentially includes all other blocks of the newly-identified heat sequence 220 in the same order (e.g., the partial sequence 218 includes the sequence of data blocks 'W J F N' rather than the full heat sequence 220 'W J F Z N B').

When the storage device 200 receives a subsequent request to read the newly-identified heat sequence 220, the storage device controller executes two sequential reads—one read of the partial heat sequence 218 and another read of a portion 222 (indicated by dotted box) of the heat sequence 214 to retrieve data of the data blocks Z and B. In memory, the storage device splices together the read data to reconstruct the newly-identified heat sequence 220 that was requested by a host. This reconstructed heat sequence is then provided to a host (not shown). Although this example instance of heat sequence reconstruction entails execution of two sequential read operations, other instances of heat sequence reconstruction may entail execution of three or more sequential reads.

By selectively writing some full heat sequences and some partial heat sequences in the complete region 208, as explained above, a balance can be achieved between fast access (e.g., a large number of data blocks may still be read sequentially) and capacity (e.g., to allow the read cache 202 to ultimately store a larger quantity of user data.

Although the storage device controller de-duplicates in the example of FIG. 2, the storage device controller may, in other implementations, permit duplication to some extent. One example of selective read cache block duplication is discussed below with respect to FIG. 3, below.

Figure 3:
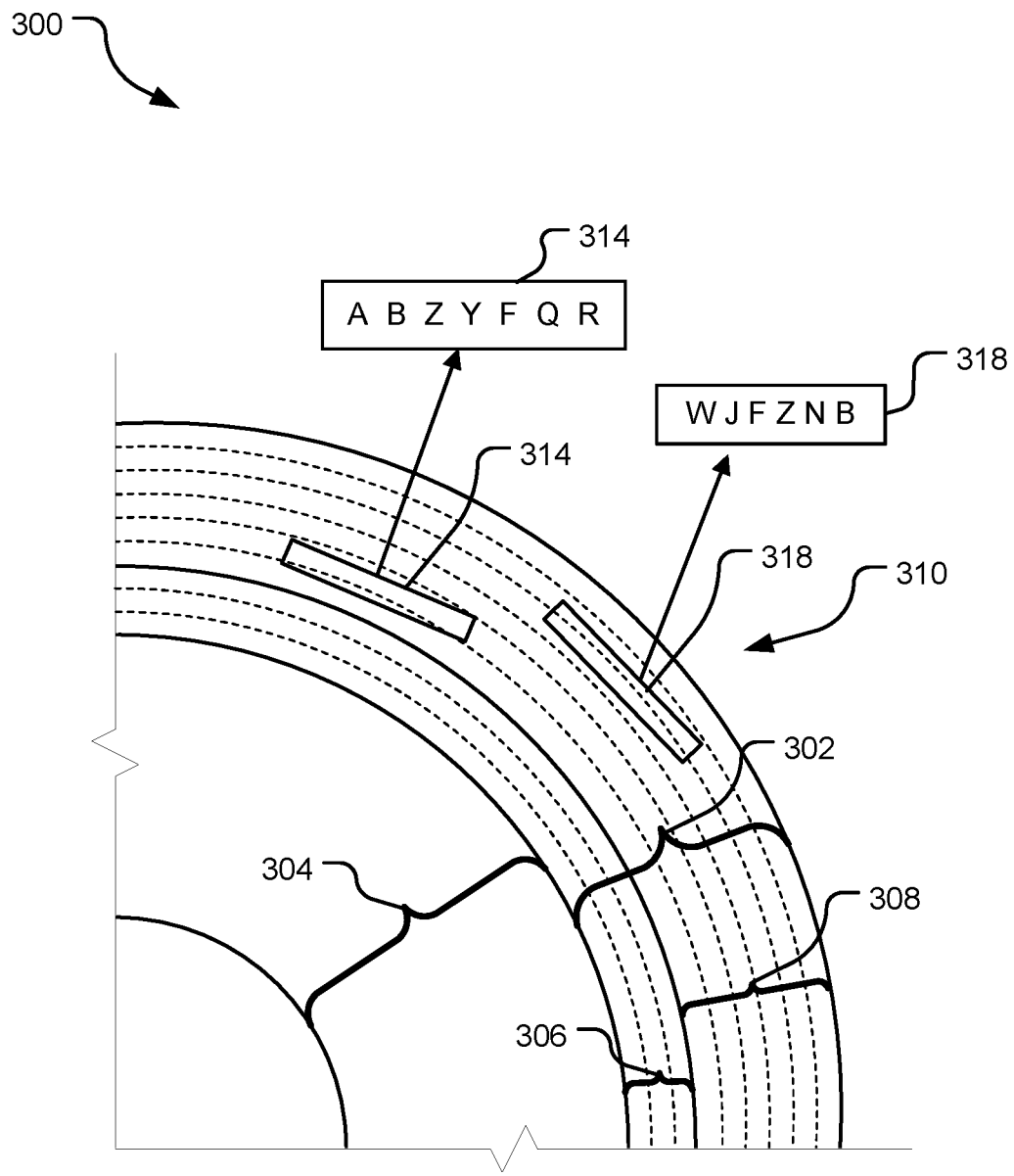
FIG. 3 illustrates an example storage system for implementing further techniques for read cache re-sequencing and cache data duplication management.

FIG. 3 illustrates an example storage system 300 implementing further techniques for read cache resequencing and duplication management. The storage system 300 includes at least one magnetic disk 310, with storage space allocated between a read cache 302 and a main store 304. The read cache 302 is divided into a first and a second contiguous region, referred to herein as an incomplete region 306 and a complete region 308. The incomplete region 306 stores hot data randomly, without regard for an order in which various blocks of data may be accessed. In contrast, the complete region 308 stores identified heat sequences sequentially, to permit for sequential read back of each sequence by a host device.

The storage system 300 of FIG. 3 may identify hot data and manage the incomplete region 306 as described above with respect to FIG. 2. However, when writing sequential heat sequences to the complete region 308, the storage system 300 selectively permits instances of duplication. In the illustrated example, the complete region 308 sequentially-stores two heat sequences 314 and 318. Notably, the example heat sequences 314 and 318 of FIG. 3 each store some common data blocks—B and Z, which appear in duplicate in both heat sequences 314 and 318.

In one implementation, the storage device controller monitors potential duplication within multiple identified heat sequences and selectively de-duplicates or permits duplication based on current duplication statistics. When duplication is not permitted, the storage device controller may write one or more partial heat sequences to the complete region 308, intentionally omitting any data block(s) in the heat sequence that already appear within another sequentially-stored heat sequence, as described above with respect to FIG. 2. In other instances, however, the storage device controller assesses current cache duplication statistics and permits duplicate data blocks to be physically written within multiple read cache locations, as illustrated in FIG. 3.

Allowing duplication in multiple hot sequences, such as the sequences 314 and 318, increases the speed at which the storage system 300 can read back data of each of the heat sequences 314 and 318 to a host. This increased access speed significantly reduces the gap in performance between HDD and SSHD devices. Notably, however, cache data duplication consumes storage space, and there exist circumstances when an interest in efficient usage of read cache capacity may outweigh the interest in high speed data access. In these instances, the cache management module may elect to selectively de-duplicate (e.g., by writing a partial heat sequence) and relying on a mapping that links together select data blocks from multiple sequentially-stored heat sequences to reconstruct a particular requested heat sequence.

Rules for handling data block duplication in sequentially-stored heat sequences may vary in different implementations according to desired performance statistics and current disk usage. In some implementations, duplication rules are designed to achieve a balance between performance and read cache capacity. For example, duplication may be permitted until a total number of instances of data block duplication in the read cache 302 reaches a predetermined maximum. For example, up to twenty instances of duplication may be permitted within the complete region 308. When this threshold is exceeded, any newly-identified heat sequences may be selectively de-duplicated and sequentially stored as partial heat sequences. In some cases, the storage device controller may selectively re-write and de-duplicate previously-identified and sequentially-stored heat sequences to free capacity in the read cache 302. In at least one implementation, a limit is placed on the maximum length of a contiguous sequence of duplicated data blocks within the complete region 308.

In one implementation, the read cache management module maintains a log of read requests pertaining to heat sequence data. Using this log, the read cache management module ranks and re-ranks the sequentially-stored heat sequences over time. When a previously-identified heat sequence fails to satisfy one or more requisite access frequency criteria, the read cache management module may elect to overwrite the previously-identified and sequentially-stored heat sequence with a newly-identified heat sequence. In other cases, storage space including one or more sequentially-stored heat sequences may be erased or simply made available for overwrite of newly-identified heat sequence data. In one implementation, the read cache management module performs maintenance of the complete region 308 to shift heat sequence data around in the complete region 308, such as to relocate available storage space together and thereby defragment the complete region 308.

Figure 4:
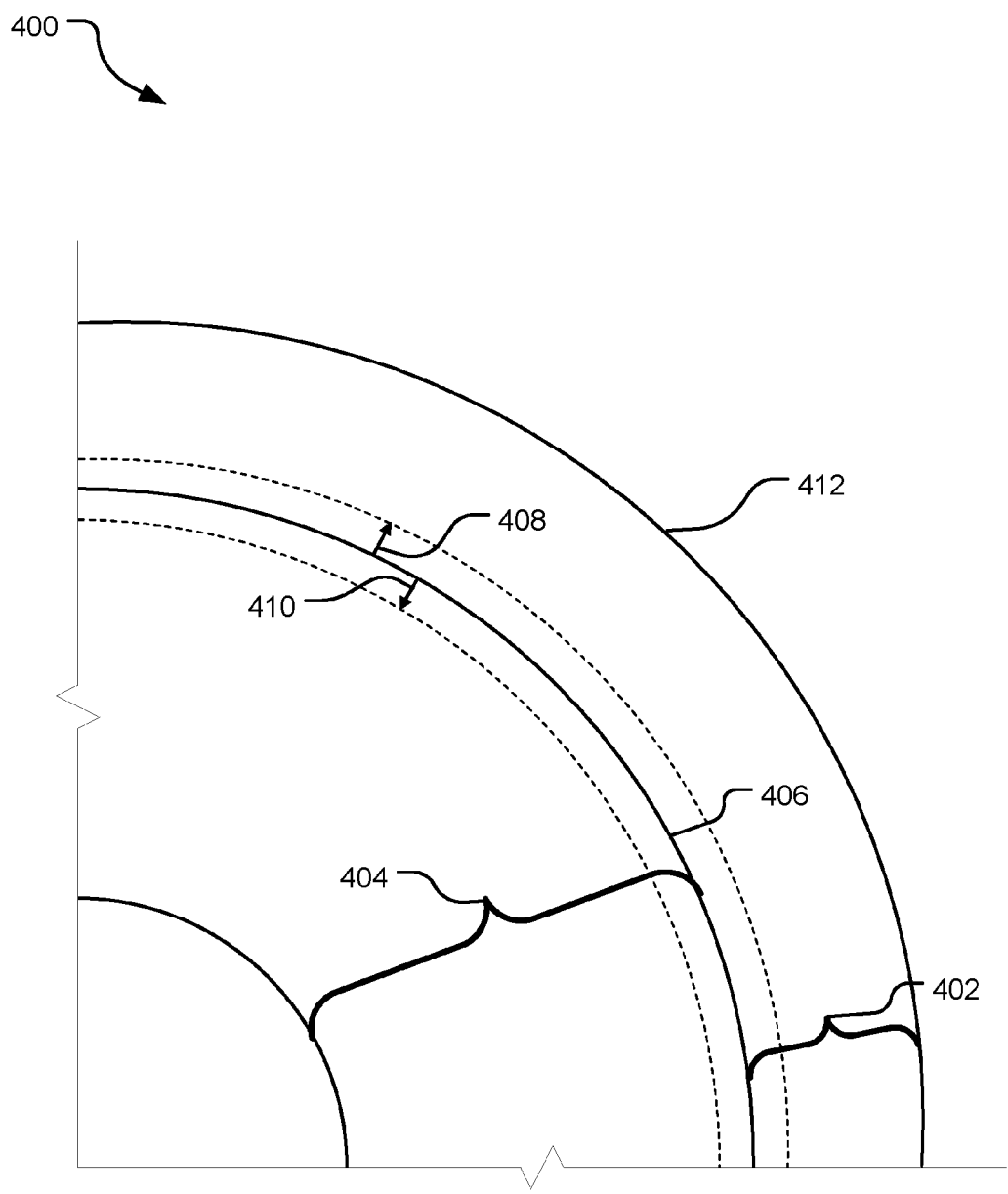
FIG. 4 illustrates another example storage system for implementing dynamic read cache management techniques.

FIG. 4 illustrates an example storage system 400 implementing dynamic read cache management techniques. The storage system 400 includes a magnetic disk 412 with physical data storage allocated between a read cache 402 and a main store 404. The main store 404 acts as a primary storage region for user data, while the read cache 402 stores redundant copies of data determined to meet certain "hot data" requirements. Although not shown, the read cache 402 may be further divided into two or more sub-regions, such as regions for storing "incomplete" (fragmented) hot data blocks and "complete" (sequentially-stored) heat sequences, as described in FIG. 2.

In one implementation, the magnetic disk 412 is an overprovisioned drive and the read cache 402 is statically allocated to occupy overprovisioned space that is not part of the nominal capacity of the storage system 400. "Overprovisioning" refers to the practice of producing and shipping more actual storage capacity than the storage capacity that is sold or marketed to the client or marketplace. Thus, for example, if a storage capacity of 1 TB is sold to a client, the storage provider actually produces ten percent more capacity, thus 1.1 TB of storage capacity is produced in the device. In some cases, the read cache 402 is mapped to a physical region within this extra capacity and the device controller does not, at any time, receive host-initiated writes of user data directed to the read cache 402.

In another implementation, the read cache 402 is not included in overprovisioned drive space and physical data blocks can be dynamically allocated back-and-forth between the read cache 402 and the main store 404. For example, a boundary 406 is dynamic and moveable by a cache management module of the storage device to re-allocate a distribution of physical storage between the read cache 402 and main store 404 based on satisfaction of certain conditions. In systems implementing such dynamic read cache resizing techniques, the read cache 402 may be part of the "nominal" capacity of the storage system 400 and each data block in the main store 404 and the read cache 402 may be included in an LBA addressing scheme of a host computer (not shown). Stated differently, the storage device 400 may occasionally receive host-initiated writes of user data directed to physical data blocks located in the read cache 402.

To implement a read cache in the above-mentioned "dynamic" storage allocation implementations, a storage device controller may implement a dynamic remapping and redirection scheme to direct incoming writes away from the read cache 402 for a period of time, such as until the drive becomes so full that it is desirable to use storage space of the read cache 402 for storage of user data instead of as a read cache.

In one such implementation, the storage device controller remaps host LBAs corresponding to physical data blocks of the read cache 402 to physical data blocks in the main store 404 and redirects all incoming use data writes to those remapped locations and to other locations of the main store 404 until a capacity utilization of the main store 404 satisfies one or more predetermined capacity criterion. For example, predetermined capacity criteria may specify a distribution or a quantity of available (unutilized) space remaining in the main store 404. When the capacity utilization of the main store 404 satisfies one or more predetermined capacity criterion, the storage device controller relinquishes (e.g., gives up) capacity of the read cache 402 to the main store 404. In this case, data blocks formerly used for the read cache 402 may be reallocated for receipt and storage of user data as part of the main store 404.

The storage device controller may utilize a number of suitable mapping and redirection schemes to implement dynamic read cache resizing. In one implementation, the storage device controller relinquishes the entire read cache 402 to the main store 404 responsive to a determination that the predetermined capacity criteria are satisfied. In another implementation, the storage device controller incrementally relinquishes storage space in the read cache 402 to the main store 404. For example, the storage device controller may give up 10% of the read cache 402 to the main store 404 responsive to a determination that available storage of the main store 404 has dropped to a first threshold, give up another 10% of the read cache 402 to the main store 404 responsive to a determination that the available storage of the main store 404 has dropped to a second threshold, etc.

In one implementation, read cache 402 is incrementally relinquished to the main store 404 via contiguous storage regions that share a boundary with the main store 404. For example, incrementally relinquishing portions of the read cache 402 to the main store 404 may entail shifting of a boundary 406 between the read cache 402 and the main store 404 in the direction indicated by an arrow 408. In the event that additional storage space is subsequently made available in the main store 404, the storage device controller may also be capable of reallocating space from the main store 404 to the read cache 402, such as by shifting the boundary 406 in the direction indicated by an arrow 410.

In one implementation, a static portion of the read cache 402 exists in overprovisioned space (e.g., external to the host's logical block address to physical block address mapping scheme), and a dynamic portion of the read cache 402 dynamically exists as part of the nominal capacity of the drive. The dynamic portion may be relinquished (e.g., incrementally or all at once) to the main store 404 upon a determination that the storage device satisfies predetermined capacity criteria, as discussed above.

In still further implementations, the storage device 400 includes a write cache (not shown) in addition to the read cache 402, and a boundary between the write cache and the read cache is dynamic and moveable by a cache management module based on satisfaction of current drive usage criteria. If, for example, the storage device 400 is used as a back-up drive and the drive is receiving a lot of new data, the storage device controller may allocate more storage space to the write cache than the read cache. If, however, the storage device 400 is being used primarily for intensive read operations, the storage device controller may allocate more storage space to the read cache than the write cache. The allocation of storage space between write cache and read cache may be shifted dynamically in a manner similar to that discussed above with respect to the boundary 406 between the read cache 402 and the main store 404 in FIG. 4.

Figure 5:
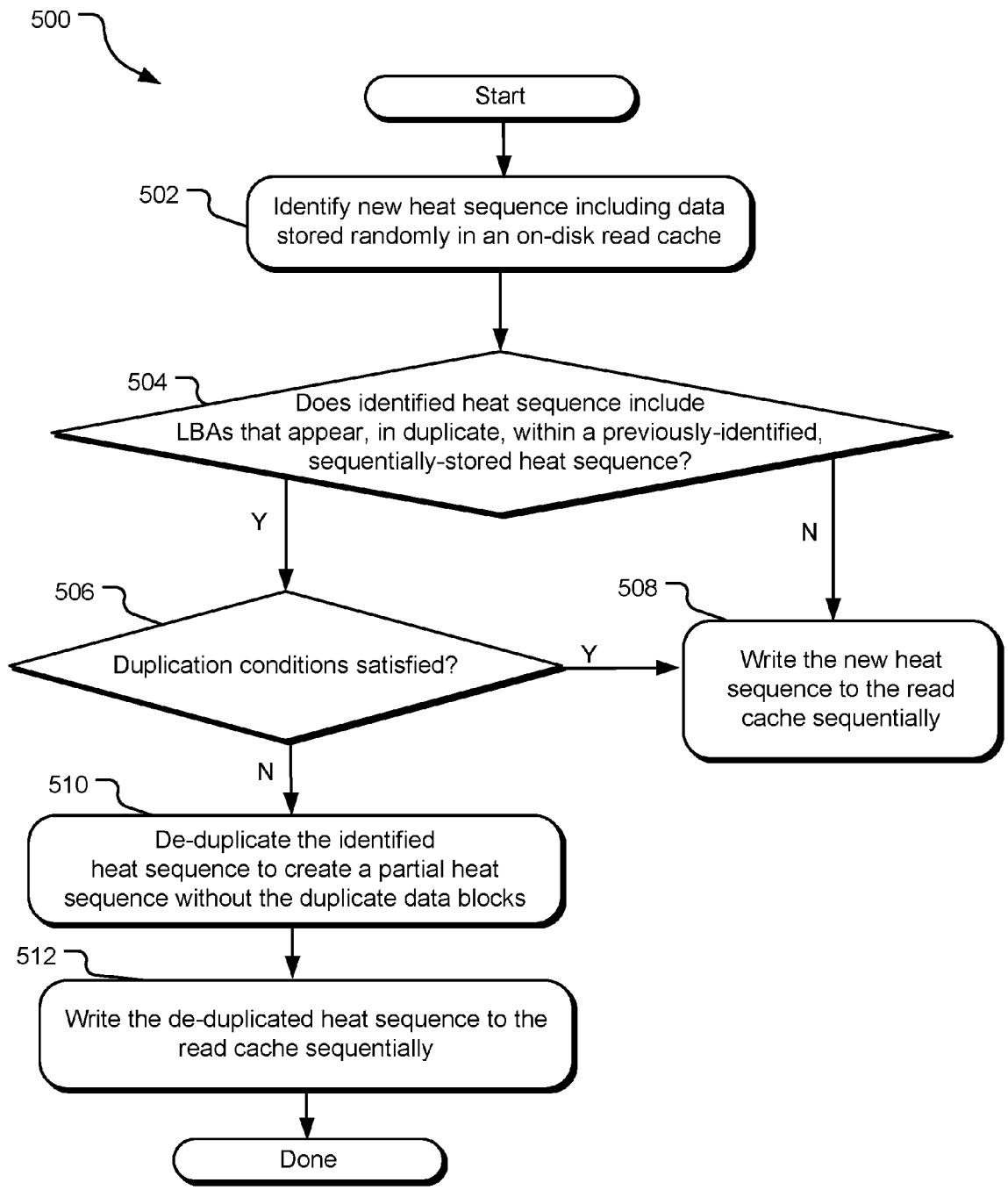
FIG. 5 illustrates example operations for heat sequence detection and data duplication management of an on-disk read cache.

FIG. 5 illustrates example operations 500 for read cache resequencing and data duplication management of a read cache located on a magnetic disk. A first identification operation 502 identifies a new heat sequence including data randomly-stored in an on-disk read cache. In one implementation, the identified heat sequence consists of data that is all stored in the read cache, at least some of which is stored randomly (e.g., on non-contiguous data blocks) relative to the order in which a corresponding LBA sequence is requested by a host device. For example, the identified heat sequence may include groups of data blocks stored on two or more different non-adjacent data tracks. In one implementation, the heat sequence is identified according to predefined access frequency criteria, such as based on a frequency or recency with which the sequence requested by a host device.

A determination operation 504 determines whether the identified new heat sequence includes any LBAs that appear, in duplicate, within a previously-identified and sequentially-stored heat sequence of the read cache. In one implementation, the read cache includes a first region including randomly-stored hot data (e.g., hot data blocks of 32 KB or less) and a second region including sequentially-stored heat sequences identified based on reads of the first region of the read cache. If no LBAs of the identified new heat sequence appear, in duplicate, within any of the previously-identified sequentially-stored heat sequences, a write operation 508 writes the identified new heat sequence to the read cache sequentially (e.g., in an order that facilitates a sequential read back of the heat sequence). In one implementation, the newly-identified heat sequence is written to a contiguous region of the cache reserved for sequential storage of identified heat sequences.

If, on the other hand, one or more LBAs of the newly-identified heat sequence do appear within a previously-identified sequentially-stored heat sequence, another determination operation 506 determines whether a number of LBA duplicates appearing in the read cache satisfies one or more duplication conditions. For example, one duplication condition may specify a total number of permitted instances of duplication in the read cache. If a total number of current LBA duplicates in the read cache is low relative to the duplication threshold, the duplication condition is satisfied and duplication is permitted. In this case, the write operation 508 writes the new heat sequence to the read cache with duplicate data blocks and in a manner that provides for a subsequent sequential read of the sequence. Permitting duplication in this manner enables a fastest-possible read back of the identified heat sequence via a single sequential read operation.

If, on the other hand, a total number of LBA duplicates in the read cache is high, the determination operation 508 may determine that the duplication conditions are not satisfied. In this case, a de-duplication operation 510 de-duplicates the new heat sequence to omit the data blocks that already appear in the previously-identified, sequentially-stored heat sequence. The result of the de-duplication operation 510 is a partial heat sequence that omits the identified, duplicate data blocks but is otherwise identical to the new heat sequence. A write operation 512 writes the de-duplicated heat sequence to the read cache sequentially to facilitate a sequential read back of de-duplicated heat sequence. In this case, a read of the newly-identified heat sequence entails execution of two or more sequential reads and a splicing together of data from different locations in the read cache.

In one implementation, the read cache includes a first contiguous region that stores the sequentially-stored heat sequences and a second contiguous region that includes randomly-stored hot data independent of read sequence. In some implementations, storage space is dynamically allocable between the read cache and the main store, such as based on quantity and/or distribution of data currently residing in the main store. For example, the main store and read cache may be contiguous regions sharing a boundary that is dynamically alterable by the storage device controller. In some implementations, the read cache is included in an overprovisioned space of an overprovisioned HDD device. In other implementations, the read cache is part of the nominal capacity of the drive and the storage device controller directs host-initiated new data writes away from the read cache and to re-mapped main store locations for a period of time as the drive begins to fill up, such as until a capacity condition is satisfied.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:

monitoring access frequency statistics for each of a plurality of data segments stored in a main store data region of a storage device;

copying each of the data segments from the main store data region to a first contiguous region of a read cache responsive to a determination that read requests for the corresponding data segment satisfy at least one predetermined access frequently criteria;

time-sequentially reading a series of non-contiguous data blocks from the first contiguous region of the read cache, the series of non-contiguous data blocks storing a data sequence including a subset of the copied data segments identified by a requested sequence of logical block addresses (LBAs);

determining that read requests for the data sequence satisfy at least one of the predetermined access frequency criteria; and responsive to the determination, re-writing data of the data sequence to a consecutive series of contiguous data blocks in a second contiguous region of the read cache to facilitate a subsequent sequential read of the data sequence, the second contiguous region being separate from the first contiguous region.

2. The method of claim 1, wherein the read cache resides in an outer diameter region of a disk.

3. The method of claim 2, wherein
the first contiguous region includes sequentially-stored data sequences identified as satisfying the at least one predetermined access frequency criteria; and
the second continuous region including data stored randomly.

4. The method of claim 1, wherein the first contiguous region is closer to an outer diameter of the magnetic disk than the second contiguous region.

5. The method of claim 1, further comprising:
determining that the data sequence includes duplicate data also included in another sequentially-stored data sequence of the read cache previously-identified as satisfying the at least one predetermined access frequency criteria;
assessing a current volume of duplicate data in the read cache; and
based on the assessment, writing the duplicate data to the read cache.

6. The method of claim 1, further comprising:
determining that the data sequence includes duplicate data also included in another sequentially-stored data sequence of the read cache previously-identified as satisfying the at least one predetermined access frequency criteria;
assessing a current volume of duplicate data in the read cache; and
based on the assessment, omitting the duplicate data when re-writing the data sequence.

7. The method of claim 1, further comprising:
dynamically adjusting an allocation of storage space between the read cache and a main store based on current capacity utilization of the main store.

8. The method of claim 1, wherein the read cache includes dynamically provisioned physical space.

9. The method of claim 8, wherein the method further comprises directing writes of new incoming data away from the read cache until current capacity utilization of the main store data region satisfies at least one predetermined condition.

10. A storage device comprising:
a disk including a read cache; and
a controller configured to:
monitor access frequency statistics for each of a plurality of data segments stored in a main store data region of a storage device;
copy each of the data segments from the main store data region to a first contiguous region of a read cache responsive to a determination that read requests for the corresponding data segment satisfy at least one predetermined access frequently criteria;
time-sequentially read a series of non-contiguous data blocks from the first contiguous region of the read cache, the series of non-contiguous data blocks storing a data sequence including a subset of the copied data segments identified by a requested sequence of logical block addresses (LBAs);
determine that read requests for the data sequence satisfy at least one of the predetermined access frequency criteria; and
responsive to the determination, re-write data of the data sequence to a consecutive series of contiguous data blocks in a second contiguous region of the read cache to facilitate a subsequent sequential read of the data sequence, the second contiguous region being separate from the first contiguous region.

11. The storage device of claim 10, wherein the
first contiguous region includes sequentially-stored data sequences identified as satisfying the at least one access frequency criteria; and
the second continuous region includes data stored randomly.

12. The storage device of claim 10, wherein the controller is further configured to:
determine that the requested sequence includes duplicate data also included in another sequentially-stored data sequence of the read cache previously-identified as satisfying the at least one predetermined access frequency criteria;
assess a current volume of duplicate data in the read cache; and
based on the assessment, writing the duplicate data to the read cache.

13. The storage device of claim 10, wherein the controller is further configured to:
determine that the requested data sequence includes duplicate data also included in another sequentially-stored data sequence of the read cache previously-identified as satisfying the at least one predetermined access frequency criteria;
assess a current volume of duplicate data in the read cache; and
based on the assessment, omitting the duplicate data when re-writing the data sequence.

14. The storage device of claim 10, wherein the controller is further configured to:
dynamically adjust an allocation of storage space between the read cache and a user data storage space based on current capacity utilization of the main store data region.

15. The storage device of claim 10, wherein the read cache includes dynamically provisioned physical space.

16. The storage device of claim 10, wherein the storage device controller is further configured to direct writes of new incoming data away from the read cache until current capacity utilization of the main store data region satisfies at least one predetermined condition.

17. A method comprising:
time-sequentially reading a series of non-contiguous data blocks storing a data sequence in a read cache of a storage device, the data sequence identified by a requested sequence of logical block addresses (LBAs);
determining that read requests for the data sequence satisfy at least one predetermined access frequency criteria;
responsive to the determination, identifying duplicate data in the data sequence that is also included in another sequentially-stored data sequence of the read cache previously-identified as satisfying the at least one predetermined access frequency criteria; and
responsive to the identification, re-writing data of the data sequence to a series of contiguous data blocks in the read cache to facilitate a subsequent sequential read of the data sequence, the re-written data of the data sequence omitting the duplicate data.

* * * * *